US011831059B2

United States Patent
Kato et al.

(10) Patent No.: US 11,831,059 B2
(45) Date of Patent: Nov. 28, 2023

(54) FUEL CELL STACK AND OPERATION METHOD FOR FUEL CELL STACK

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yuma Kato, Kawasaki Kanagawa (JP); Akira Maekawa, Kawasaki Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/586,500

(22) Filed: Jan. 27, 2022

(65) Prior Publication Data

US 2022/0158219 A1 May 19, 2022

Related U.S. Application Data

(63) Continuation of application No. PCT/JP2020/033618, filed on Sep. 4, 2020.

(30) Foreign Application Priority Data

Sep. 5, 2019 (JP) .................. 2019-162198

(51) Int. Cl.
*H01M 8/04* (2016.01)
*H01M 8/2483* (2016.01)
(Continued)

(52) U.S. Cl.
CPC ......... *H01M 8/2483* (2016.02); *H01M 8/023* (2013.01); *H01M 8/0267* (2013.01); *H01M 8/04291* (2013.01)

(58) Field of Classification Search
CPC .. H01M 8/2483; H01M 8/023; H01M 8/0267; H01M 8/04291
See application file for complete search history.

(56) References Cited

U.S. PATENT DOCUMENTS

| | | | |
|---|---|---|---|
| 2003/0124414 A1 | 7/2003 | Hertel et al. | |
| 2012/0094215 A1* | 4/2012 | Satou | H01M 4/8605 429/535 |
| 2020/0212467 A1* | 7/2020 | Kim | H01M 8/1044 |

FOREIGN PATENT DOCUMENTS

| | | |
|---|---|---|
| JP | 2002-25584 A | 1/2002 |
| JP | 2005-158596 A | 6/2005 |
| JP | 2013-191433 A | 9/2013 |

OTHER PUBLICATIONS

J.I.S. Cho, et al., "Capillaries for water management in polymer electrolyte membrane fuel cells", Int'l J. of Hydrogen Energy, vol. 43, No. 48, pp. 21949-21958, https://doi.org/10.1016/j.ijhydene.2018.10.030 (Oct. 29, 2018).

* cited by examiner

*Primary Examiner* — Olatunji A Godo
(74) *Attorney, Agent, or Firm* — Finnegan, Henderson, Farabow, Garrett & Dunner, LLP

(57) ABSTRACT

According to the present embodiment, a fuel cell stack comprises a cell stack having a plurality of unit cells stacked therein, each of the unit cells including an electrolyte membrane, a fuel-electrode porous passage plate, and an oxidant-electrode porous passage plate, wherein in the cell stack, at least a part of one main surface of a conductive fuel-electrode porous passage plate is in contact with one main surface of a conductive oxidant-electrode porous passage plate, and a capillary force of water contained in a hydrophilic micropores of the conductive fuel-electrode porous passage plate and the conductive oxidant-electrode (Continued)

porous passage plate prevents an oxidant gas in an oxidant-electrode passage and a fuel gas in a fuel-electrode passage from directly mixing together.

13 Claims, 15 Drawing Sheets

(51) Int. Cl.
*H01M 8/023* (2016.01)
*H01M 8/0267* (2016.01)
*H01M 8/04291* (2016.01)

FUEL CELL STACK AND OPERATION METHOD FOR FUEL CELL STACK

CROSS-REFERENCE TO RELATED APPLICATIONS

This application is a continuation application of International Application No. PCT/JP2020/033618, filed Sep. 4, 2020, which claims priority to Japanese Patent Application No. 2019-162198 filed Sep. 5, 2019. The contents of these applications are incorporated herein by reference in their entirety.

FIELD

Embodiments of the present invention relate to a fuel cell stack and an operation method for a fuel cell stack.

BACKGROUND

A fuel cell stack is an electricity generation device that causes an electrochemical reaction of a fuel gas such as hydrogen and an oxidant gas such as air to convert chemical energy of a fuel into electrical energy. As for fuel cells, there are known several types different in electrolyte which include a solid oxide type, a molten carbonate type, a phosphoric acid type, and a solid polymer type, for example. These different types of fuel cells are used in different applications due to the difference in operation conditions or the like. Among them, a solid polymer fuel cell has been widely developed and put into practical use as a power source for automobiles, home use, and business use because it has a low operating temperature, can be easily started and stopped, and can have a high output density.

A solid electrolyte membrane fuel cell using a proton (hydrogen ion) exchange type electrolyte membrane is currently the mainstream of the solid polymer fuel cell. In the electrolyte membrane, it is necessary to hydrate the electrolyte membrane in order to ensure proton conductivity, and a fuel gas and an oxidant gas are humidified and operated. Examples of the method for humidifying a gas include a method in which a humidifier is provided outside a fuel cell stack (an external humidification method) and a method in which humidification is performed inside a cell stack (an internal humidification method). Generally, when the flow rate of a gas supplied to a cell stack is high, the humidity at a gas inlet of the stack decreases and the stack becomes dry. However, it is known that deterioration of electrolyte membranes constituting a fuel cell stack is accelerated at a lower humidity and a higher temperature.

Meanwhile, the operating temperature of a solid polymer fuel cell that is widely put into practical use at present is equal to or lower than the boiling point of water, and reaction product water in an oxidant electrode and humidifying water that becomes excessive (supersaturated) with hydrogen consumption in a fuel electrode are condensed in a cell. In a case where the condensed water is retained and closes a gas passage, oxygen or hydrogen required for a reaction becomes insufficient, causing drop of a cell voltage and an unstable operation. In particular, in a case where hydrogen is insufficient in the fuel electrode, a carbon corrosion reaction, in which carbon (a carbon member) constituting a cell member reacts with water to form carbon dioxide and protons, is promoted. As a result, the cell member may be worn and the cell may be significantly deteriorated.

DETAILED DESCRIPTION

Figure 1:
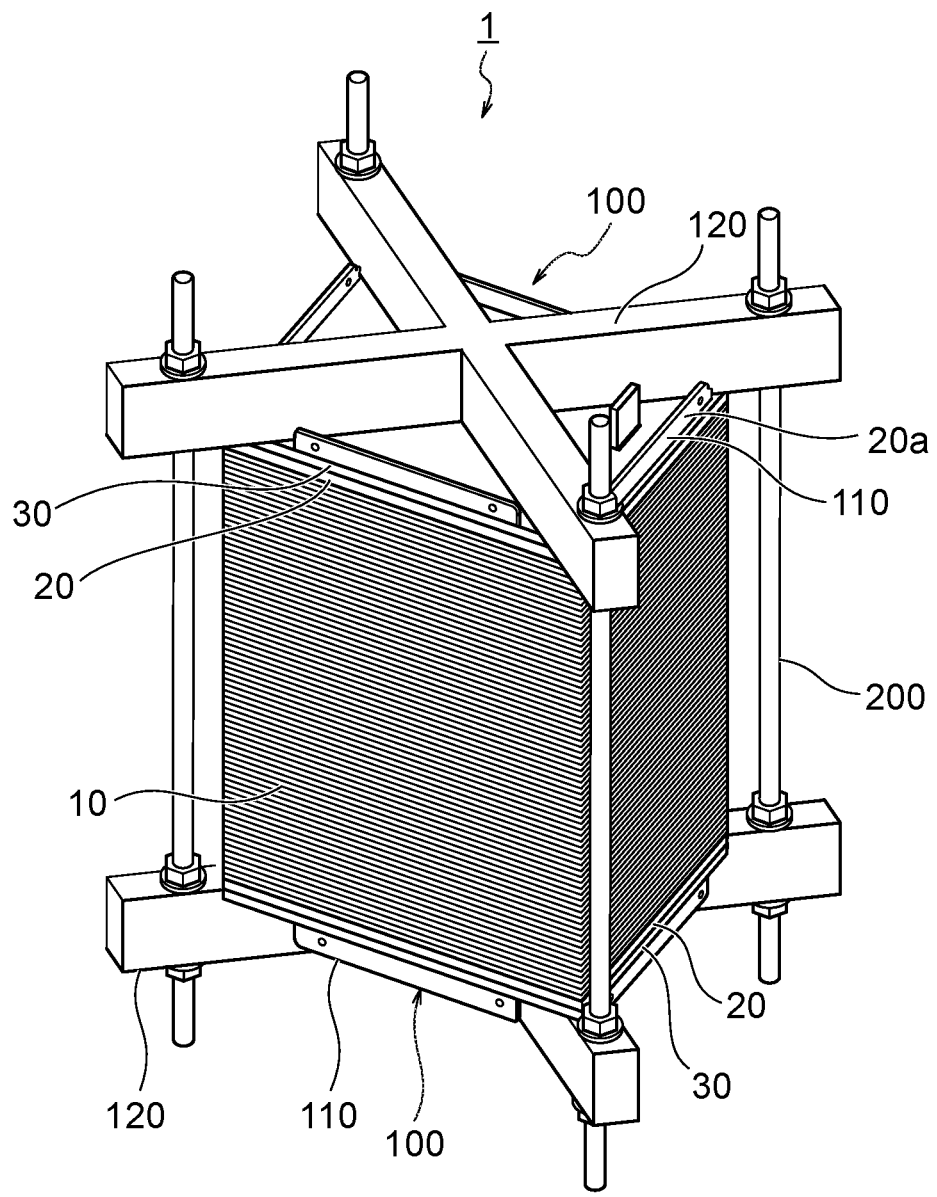
FIG. 1 is a perspective view illustrating a configuration of a fuel cell stack having its manifold removed therefrom.

Embodiments of the present invention will now be explained in detail with reference to the accompanying drawings. In the drawings accompanying this specification, for the conveniences of illustration and easier understanding, the scales, horizontal and vertical sizes and the like of constituent elements are illustrated in a modified or exaggerated manner with regard to actual products.

According to the present embodiment, a fuel cell stack comprises a cell stack having a plurality of unit cells stacked therein, each of the unit cells including an electrolyte membrane having one main surface in which a fuel electrode is arranged and the other main surface that is opposite to the one main surface and in which an oxidant electrode is arranged, a fuel-electrode porous passage plate in which a fuel-electrode passage is formed in a main surface on a side close to the fuel electrode of the electrolyte membrane, and an oxidant-electrode porous passage plate in which an oxidant-electrode passage is formed in a main surface on a side close to the oxidant electrode of the electrolyte membrane, each of the unit cells having a cooling-water passage formed in a main surface of the fuel-electrode porous passage plate opposite to the main surface in which the fuel-electrode passage is arranged or in a main surface of the fuel-electrode porous passage plate opposite to the main surface in which the oxidant-electrode passage is arranged, wherein a cooling water pressure in a cooling-water passage is lower than a fuel gas in a fuel-electrode passage, a differential pressure between a fuel gas pressure at an inlet in the fuel-electrode passage and a cooling water pressure in the cooling-water passage corresponding to the inlet is smaller than a differential pressure between a fuel gas pressure at an outlet in the fuel-electrode passage and a cooling water pressure in the cooling-water passage corresponding to the outlet, and a large one of a maximum value of a differential pressure between the cooling water pressure and an oxidant pressure and a maximum value of a differential pressure between the cooling water pressure and a fuel electrode pressure is smaller than a capillary force in a passage plate.

According to the present embodiment, it is possible to suppress deterioration of an electrolyte membrane caused by drying and retention of condensed water.

First Embodiment

FIG. 1 is a perspective view illustrating a configuration of a fuel cell stack 1 having its manifold removed therefrom. As illustrated in FIG. 1, the fuel cell stack 1 according to one embodiment is a structure that generates electricity by an electrochemical reaction in fuel-cell cells. That is, the fuel cell stack 1 is configured to include a cell stack 10, two current collector plates 20, a power terminal 20a, two insulating plates 30, two clamping plates 100, and a plurality of tie rods 200. The clamping plate 100 includes an end plate 110 and a beam 120. FIG. 1 illustrates the Z-direction parallel to a stacking direction of the cell stack 10 and the X and Y-directions that are parallel to each other and perpendicular to the Z-direction. In a case of installing the fuel cell stack 1 according to the present embodiment on a horizontal plane, the Z-direction is the horizontal direction and is perpendicular to the gravity direction. During actual operation of the fuel cell stack 1, the x-y plane is used as the bottom.

The two current collector plates 20 are arranged on both sides of the cell stack 10 in the stacking direction. The two current collector plates 20 are plate-shaped conductors and are arranged on both end surfaces of the cell stack 10. Electrical energy is taken out from the power terminal 20a provided in the current collector plate 20. The two insulating plates 30 are plate-shaped insulators and are arranged between the two current collector plates 20 and the two clamping plates 100. As described above, the two current collector plates 20 and the two insulating plates 30 are arranged on both sides of the cell stack 10 in the stacking direction in turn, and are clamped as one unit by the two clamping plates 100 from both sides in the stacking direction, whereby the fuel cell stack 1 is obtained. The tie rods 200 are arranged to penetrate through opposed holes provided in the two clamping plates 100. In this state, nuts are tightened via washers to join the two clamping plates 100.

Figure 2:
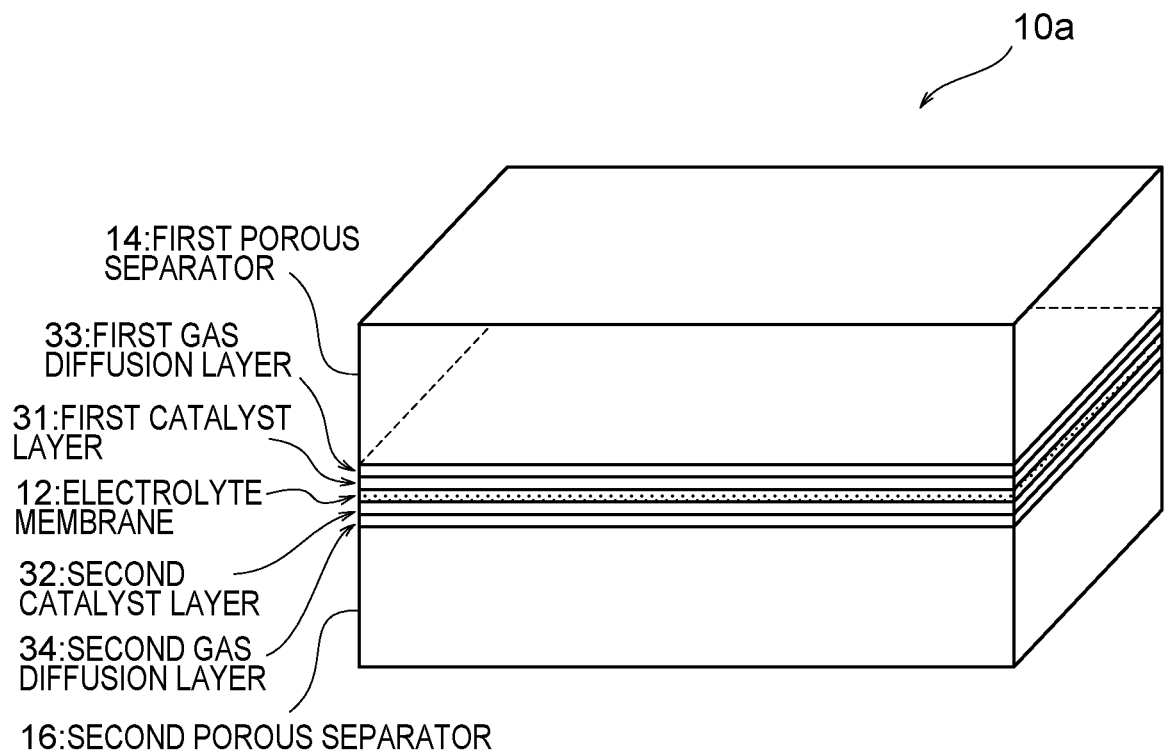
FIG. 2 is a perspective view illustrating a basic configuration of a fuel-cell cell.

The detailed configuration of a fuel-cell cell 10a according to the first embodiment is described with reference to FIGS. 2 to 5. FIG. 2 is a perspective view illustrating a basic configuration of the fuel-cell cell 10a. As illustrated in FIG. 2, the fuel-cell cell 10a includes an electrolyte membrane 12, a first porous separator 14, and a second porous separator 16. In the electrolyte membrane 12, a fuel electrode including a catalyst layer 31 and a gas diffusion layer 33 is formed on one main surface, and an oxidant electrode including a catalyst layer 32 and a gas diffusion layer 34 is formed on the other main surface. The electrolyte membrane 12 is, for example, a polymer electrolyte membrane. The electrolyte membrane 12, the catalyst layer 31, and the catalyst 32 may be collectively called "membrane-electrode complex". A plurality of the fuel-cell cells 10a are stacked to form the cell stack 10. The fuel-cell cell 10a according to the present embodiment corresponds to a unit cell.

Figure 3:
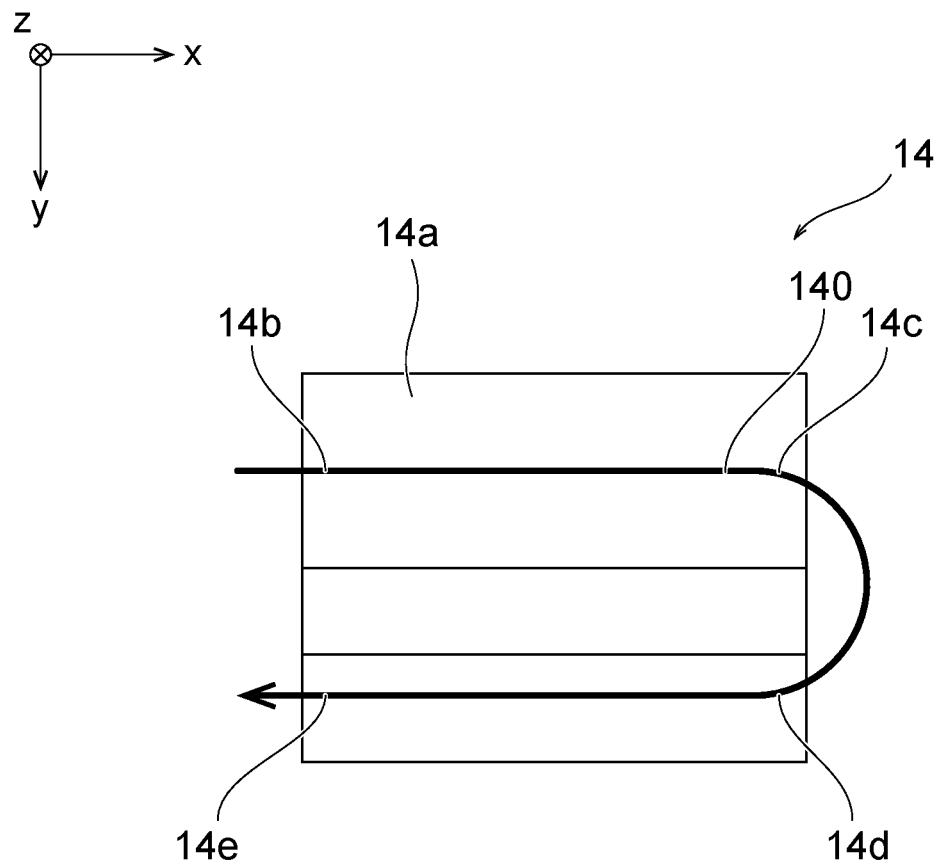
FIG. 3 is a schematic diagram illustrating a shape of a main surface of a first porous separator on a side close to a fuel electrode of an electrolyte membrane.

FIG. 3 is a schematic diagram illustrating a flow of a fuel gas in a main surface of the first porous separator 14 on a side close to a fuel electrode of the electrolyte membrane 12. As illustrated in FIG. 3, the first porous separator 14 is formed by a conductive porous plate having hydrophilic micropores. A fuel-electrode passage 140 along the fuel electrode is formed in a main surface 14a on the side close to the fuel electrode of the electrolyte membrane 12. The fuel-electrode passage 140 includes a first inlet 14b, a first outlet 14c, a second inlet 14d, and a second outlet 14e. That is, the fuel-electrode passage 140 is formed by a first fuel gas passage connecting the first inlet 14b and the first outlet 14c to each other and a second fuel gas passage connecting the second inlet 14d and the second outlet 14e to each other. A fuel gas introduced from the first inlet 14b flows along the first fuel gas passage of the fuel-electrode passage 140 and is discharged from the first outlet 14c. A fuel gas introduced from the second inlet 14d flows along the second fuel gas passage of the fuel-electrode passage 140 and is discharged from the second outlet 14e. The hydrophilic micropores of the first porous separator 14 are hydrated and allow contained water to migrate through a network of the micropores while preventing permeation of the fuel gas by a capillary force of the water in the hydrophilic micropores.

Figure 4:
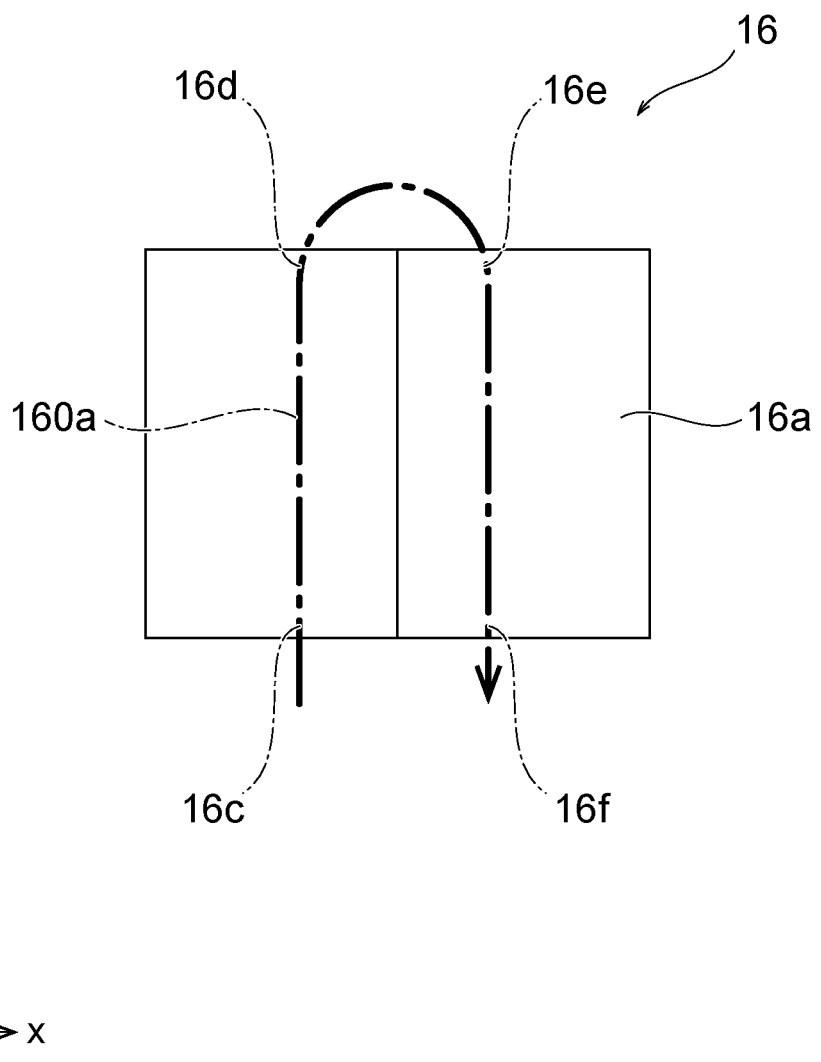
FIG. 4 is a schematic diagram illustrating a shape of a main surface of a second porous separator.
Figure 5:
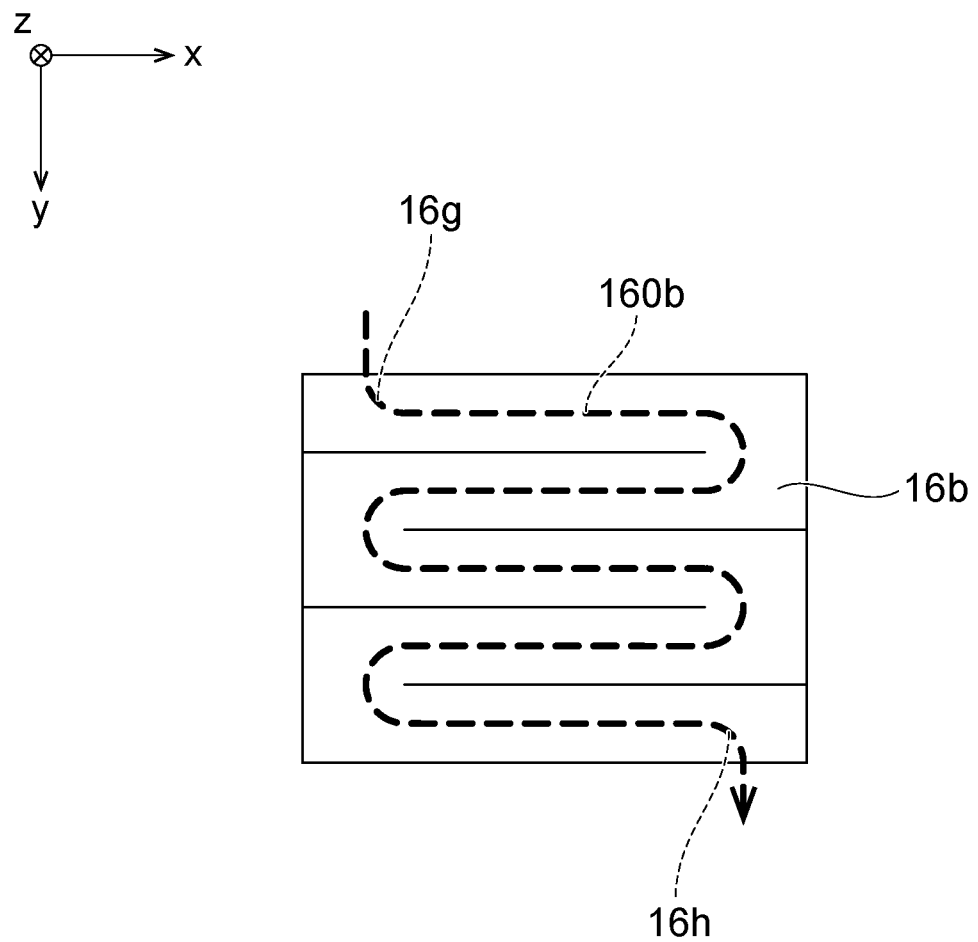
FIG. 5 is a schematic diagram illustrating a shape of a main surface opposite to the main surface of the second porous separator.

FIGS. 4 and 5 are diagrams illustrating a configuration of the second porous separator 16, where FIG. 4 is a schematic diagram illustrating a flow of an oxidant gas in a main surface 16a of the second porous separator 16, and FIG. 5 is a schematic diagram illustrating a flow of cooling water in a main surface 16b opposite to the main surface 16a of the second porous separator 16. As illustrated in FIG. 4, the second porous separator 16 is formed by a conductive porous plate having hydrophilic micropores. In the second porous separator 16, an oxidant-electrode passage 160a along an oxidant electrode is formed in the main surface 16a on a side close to the oxidant electrode of the electrolyte membrane 12. The oxidant-electrode passage 160a has a first inlet 16c, a first outlet 16d, a second inlet 16e, and a second outlet 16f. An oxidant gas introduced from the first inlet 16c flows along the oxidant-electrode passage 160a and is discharged from the first outlet 16d. An oxidant gas introduced from the second inlet 16e flows along the oxidant-electrode passage 160a and is discharged from the second outlet 16f. The first porous separator 14 and the second porous separator 16 according to the present embodiment respectively correspond to a fuel-electrode porous passage plate and a fuel-electrode porous passage plate. The hydrophilic micropores in the second porous separator 16 are also hydrated like those in the first porous separator 14 and allow contained water to migrate through a network of the micropores while preventing permeation of the oxidant gas by a capillary force of the water in the hydrophilic micropores.

As illustrated in FIG. 5, a cooling-water passage 160b is formed in the main surface 16b opposite to the oxidant electrode side. The cooling-water passage 160b has a first inlet 16g and a first outlet 16h. Cooling water introduced from the first inlet 16g flows along the cooling-water passage 160b and is discharged from the first outlet 16h. The pressure of the cooling water flowing in the cooling-water passage 160b is set to be lower than those of a fuel gas flowing in the fuel-electrode passage 140 and an oxidant gas flowing in the oxidant-electrode passage 160a. The cooling water in the cooling-water passage 160b communicates with water contained in the hydrophilic micropores in the first porous separator 14 and the hydrophilic micropores in the second porous separator 16. Accordingly, direct mixing of the fuel gas and the oxidant gas is prevented by a capillary force of the contained water. Also, the micropore network constitutes a path of humidifying the oxidant gas and the fuel gas and a path of absorbing water condensed in the oxidant gas passage and the fuel gas passage. In addition, it is possible to retain water in the hydrophilic micropores in a stable manner by maintaining a pressure difference between the pressure of the oxidant gas and the pressure of the cooling water and a pressure difference between the pressure of the fuel gas and the pressure of the cooling water to be lower than the capillary force in the micropores.

Figure 6:
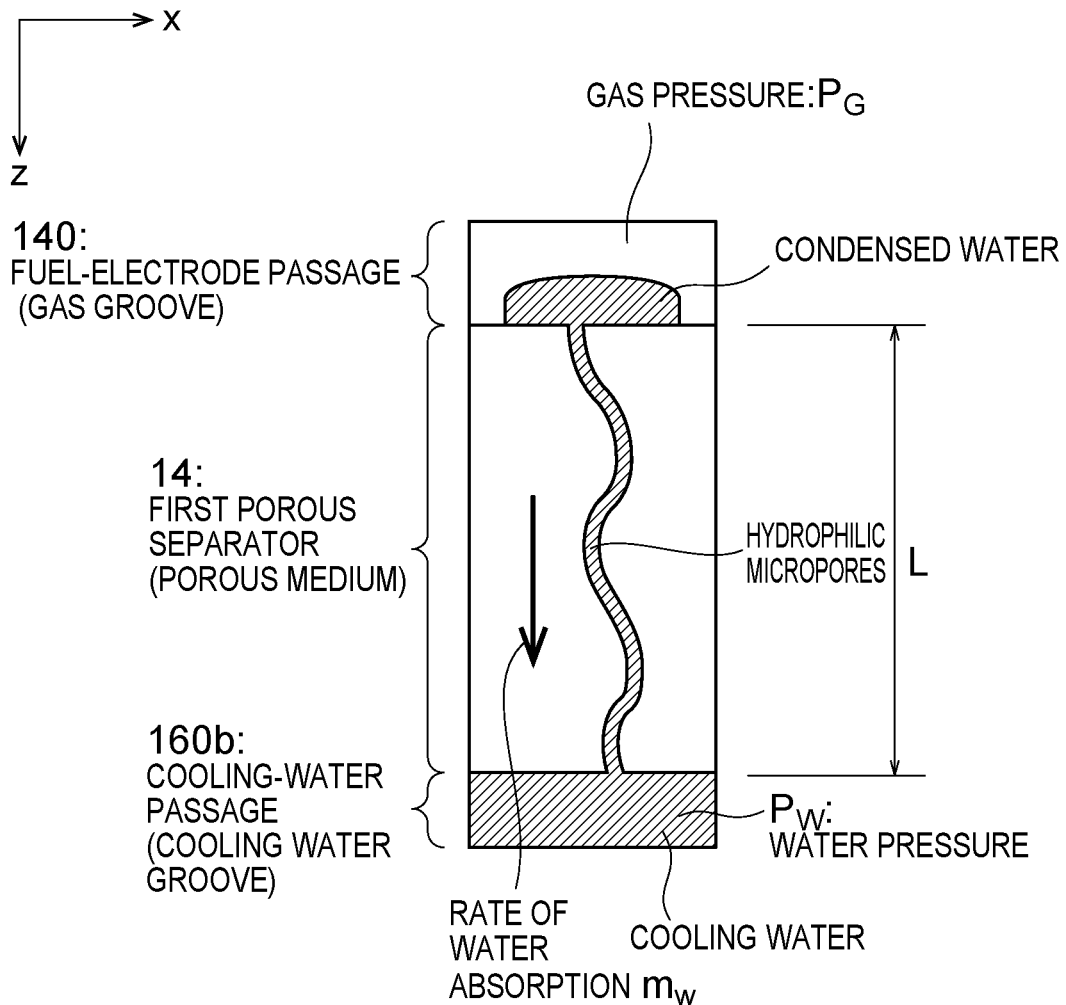
FIG. 6 is a schematic diagram illustrating a mechanism of absorbing condensed water in a porous separator.

FIG. 6 is a schematic diagram illustrating a mechanism of absorbing condensed water in a porous separator. As illustrated in FIG. 6, a rate of migration of a fluid $m_w$ (a mass flow rate) in a porous medium such as the first porous separator 14 having hydrophilic micropores is written by Expression (1) by using a permeability coefficient k [m2] of porous separator, a water pressure difference $\Delta P_w$ [Pa], a water density $p_w$ [kg/m3], and a viscosity coefficient of water $\mu w$ [Pa·S]. The water pressure difference $\Delta P_w$ is a differential pressure between a gas pressure $P_G$ [Pa] and a cooling water pressure $P_w$ [Pa]. As illustrated in FIG. 6, when the pressure of condensed water in a gas grove is substantially equal to the gas pressure $P_G$ in a passage and effects of the porosity and the tortuosity are included in the permeability coefficient K of the porous separator, a capillary length L is equivalent to the distance from the cooling-water passage (cooling water groove) 160b to the fuel-electrode passage (gas groove) 140. Therefore, under a condition in which the permeability coefficient k, the thickness, and physical properties of water are constant, the rate of water absorption becomes higher as the pressure difference between the gas pressure P G and the water pressure $P_w$, that is, a differential pressure between a gas side pressure and a cooling water pressure becomes larger. FIG. 6 illustrates a typical one fine pore for simplification. An actual separator has a complicated configuration in which a large number of fine pores are connected to form a network. Here, the permeability coefficient K can be defined as the cross-sectional area of a typical passing in the whole group of fine pores forming the network.

[Expression 1]

$$m_w [\text{kg/m}^2/\text{s}] \propto \rho_w \left(\frac{K}{\mu_W}\right)\frac{\Delta P_W}{L} \quad (1)$$

Figure 7:
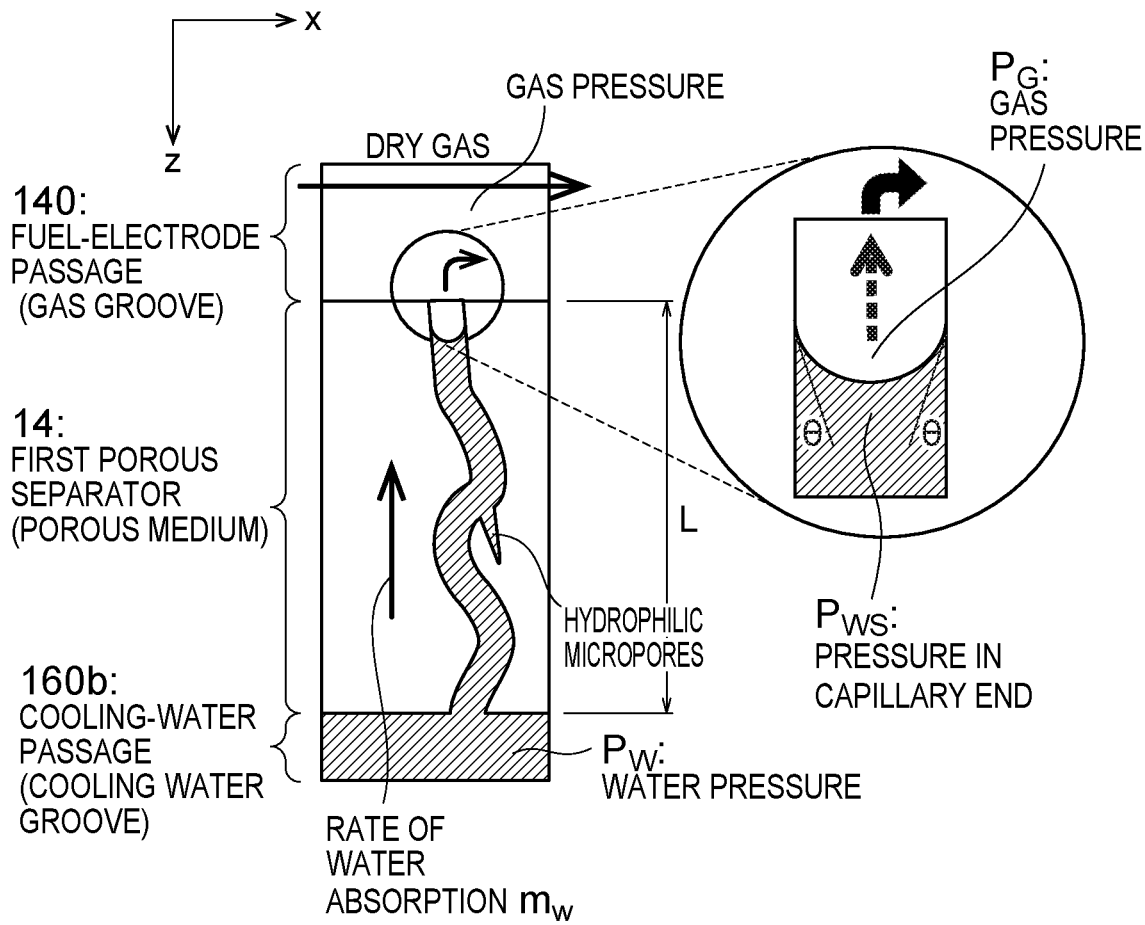
FIG. 7 is a schematic diagram illustrating a mechanism of humidifying a gas inlet in a porous separator.

FIG. 7 is a schematic diagram illustrating a mechanism of humidifying a gas inlet in a porous separator. As illustrated in FIG. 7, a rate of humidification my in a surface of the first porous separator 14 is the rate of evaporation of water from a gas-liquid interface formed at an end of a fine pore near the fuel-electrode passage 140 to a gas side. The upper limit of the evaporation rate of water is defined by a rate of transport of water by a capillary force from the cooling-water passage 160b to near the fuel-electrode passage 140. The transport rate of water follows Expression (1) also in FIG. 7, but FIG. 7 is different from FIG. 6 in that a driving pressure difference $\Delta P$ is a pressure difference between a pressure Pws in a capillary on the water side of the gas-liquid interface near a surface of a gas passage and the pressure $P_w$ in the cooling-water passage 160b. This Pws has a relation of Expression (3) with the gas pressure $P_G$. Further, since a typical pore radius rc in Expression (3) has a relation of Expression (4) with the permeability coefficient K of the separator, a relation of Expression (2) is established. Here, $p_w$ is the water density [kg/m³], $\mu_w$ is a viscosity coefficient [Pas], $\mu_w$ is a viscosity coefficient [Pas], 8 is an angle [rad] of contact of water with an inner wall of a fine pore in a porous separator, rc is a typical radius [m] of a fine pore in the porous separator, ε is a porosity [-] of the porous separator, K is the permeability coefficient [m 2] of the porous separator, and L is the distance [m] from a gas passage to a cooling water passage.

[Expression 2]

$$m_{v-max} < m_w \propto \rho_w \left[\frac{K}{\mu_w}\right]\frac{P_w \cdot P_{ws}}{L} = \frac{\rho_w}{L}\left[\frac{K}{\mu_w}\right]\left[\frac{2\gamma\cos\theta}{r_C} \boxed{-(P_G - P_W)}\right][\text{kg/m}^2/\text{s}] \quad (2)$$

[Expression 3]

$$P_{ws} = P_G - \frac{2\gamma\cos\theta}{r_C} \quad (3)$$

[Expression 4]

$$r_C = 2\sqrt{K/\varepsilon} \quad (4)$$

In Expression (2), a main driving force of water transport is a capillary pressure, and $P_G$-$P_w$ represents a reduction of the driving force. Therefore, it is desirable that $P_G$-$P_w$, that is, a differential pressure between the fuel-electrode passage 140 and the cooling-water passage 160b is as small as possible.

Similarly to FIG. 6, FIG. 7 also illustrates a typical one pore. Although an actual separator has a complicated configuration in which a large number of fine pores are connected to form a network, Expression (3) can be applied by defining the permeability coefficient as the cross-sectional area of a typical passing in the whole group of fine pores forming the network and defining the typical pore radius as the capillary characteristics. A relation between the fuel-electrode passage 140 and the cooling-water passage 160b have been described in the above description. An identical phenomenon occurs also regarding the oxidant-electrode passage 160a and the cooling-water passage 160b.

Since the fuel-cell cells 10a are stacked, the second porous separator 16 of the next fuel-cell cell 10a is stacked in the Z-direction of the first porous separator 14. Therefore, the first porous separator 14 can be cooled by cooling water in at least any one of the cooling-water passages 160b in the Z-direction. Furthermore, humidification of a fuel gas in the fuel-electrode passage 140 is affected by the cooling water pressure in the cooling-water passage 160b at the closest position. That is, humidification of the fuel gas progresses more as a differential pressure between the fuel gas pressure in the fuel-electrode passage 140 and the cooling water pressure in the cooling-water passage 160b at the closest position becomes smaller. On the contrary, as the differential pressure becomes larger, absorption of condensed water in the fuel-electrode passage 140 is promoted, and retention of the condensed water is suppressed.

Similarly, humidification of an oxidant gas in the oxidant-electrode passage 160a is affected by the cooling water pressure in the cooling-water passage 160b at the closest position. That is, humidification of the oxidant gas progresses more as a differential pressure between an oxidant gas pressure in the oxidant-electrode passage 160a and the cooling water pressure in the cooling-water passage 160b at the closest position becomes smaller. On the contrary, as the differential pressure becomes larger, absorption of condensed water in the oxidant-electrode passage 160a is promoted, and retention of the condensed water is suppressed.

Each of the fuel-cell cells 10a generates electricity by a reaction represented by Chemical formula 1. In more detail, the fuel gas is, for example, a hydrogen-containing gas. The fuel gas flows along the fuel-electrode passage 140 of the first porous separator 14 to cause a fuel electrode reaction. The oxidant gas is, for example, an oxygen-containing gas. The oxidant gas flows along the oxidant-electrode passage 160a of the second porous separator 16 to cause an oxidant electrode reaction. The fuel cell stack 1 uses these electrochemical reactions to take out electrical energy from the power terminal 20a provided in the current collector plate 20 (FIG. 1).

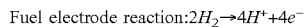
Fuel electrode reaction: $2H_2 \rightarrow 4H^+ + 4e^-$

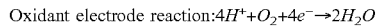
Oxidant electrode reaction: $4H^+ + O_2 + 4e^- \rightarrow 2H_2O$

Figure 8:
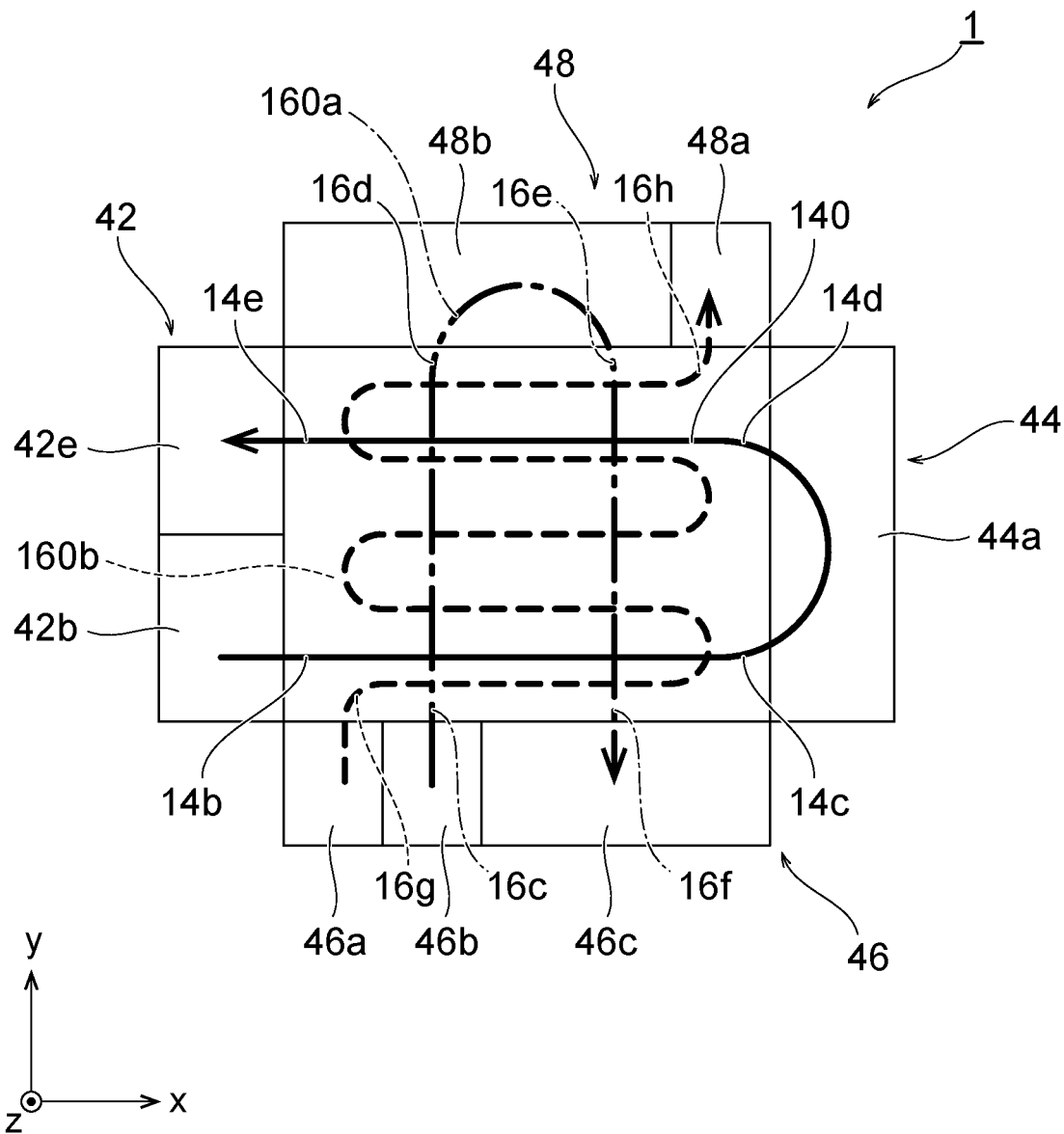
FIG. 8 is a diagram illustrating a state where a manifold is attached to a side surface along a stacking direction of a cell stack.

FIG. 8 is a diagram illustrating a state where a manifold is attached to a side surface along the stacking direction of the cell stack 10 of the fuel-cell cell stack 1. As illustrated in FIG. 8, the fuel-cell cell stack 1 includes a fuel-electrode manifold 42, a fuel-electrode facing manifold 44, a cooling-water manifold 46, and a cooling-water facing manifold 48.

The fuel-electrode manifold 42 is arranged on a first side surface along the stacking direction of the fuel-cell cell stack 1. The fuel-electrode manifold 42 is a manifold in which a supply space 42b and a discharge space 42a are divided by a divider. The supply space 42b supplies a fuel gas supplied from a fuel gas supply device to the fuel-electrode passage 140 in the fuel-cell cell 10a by the first inlet 14b. The discharge space 42a is for further discharging the fuel gas discharged from the second outlet 14e.

The fuel-electrode facing manifold 44 is arranged on a third surface corresponding to the first side surface. The fuel-electrode facing manifold 44 is a manifold that supplies a fuel gas discharged from the first outlet 14c of the fuel-electrode passage 140 to the fuel-electrode passage 140 in the fuel-cell cell 10a from the second inlet 14d.

The cooling-water manifold 46 includes a first cooling-water manifold 46a, a first oxidant-electrode manifold 46b, and a second oxidant-electrode manifold 46c. The cooling-water manifold 46 is arranged on a second side surface that is adjacent to the first side surface and is along the stacking direction of the fuel-cell cell stack 1. The first cooling-water manifold 46a is a manifold that supplies cooling water to the cooling-water passage 160b in the fuel-cell cell through the first inlet 16g.

The first oxidant-electrode manifold 46b supplies an oxidant gas supplied from an oxidant gas supply device to the oxidant-electrode passage 160a in the fuel-cell cell 10a by the first inlet 16c. The second oxidant-electrode manifold 46c further discharges the fuel gas discharged from the second outlet 16f. The first oxidant-electrode manifold 46b and the second oxidant-electrode manifold 46c are divided by a divider.

The cooling-water facing manifold 48 includes a first cooling-water facing manifold 48a and an oxidant electrode facing manifold 48b. The cooling-water facing manifold 48 is arranged on a fourth side surface that is opposed to the second side surface and is along the stacking direction of the fuel-cell cells 10a.

The first cooling-water facing manifold 48a is a manifold having a discharge space for further discharging cooling water discharged from the first outlet 16h. The oxidant electrode facing manifold 48b is a manifold that supplies an oxygen-containing gas discharged from the first outlet 16d to the oxidant-electrode passage 160a in the fuel-cell cell 10a from the second inlet 16e.

As illustrated in FIG. 8, a first fuel gas passage connecting the first inlet 14b and the first outlet 14c to each other is arranged vertically above an upstream region in the cooling-water passage 160b, and a second fuel gas passage connecting the second inlet 14d and the second outlet 14e to each other is arranged vertically above a downstream region in the cooling-water passage 160b. The cooling water pressure in the cooling-water passage 160b decreases toward the downstream side. Similarly, the fuel gas in the fuel-electrode passage 140 is reduced toward the downstream side. Further, in general, a differential pressure between the inlet 16g and the outlet 16h of the cooling-water passage 160b is larger than a differential pressure between the first inlet 14b and the first outlet 14c of the fuel-electrode passage 140.

Figure 9:
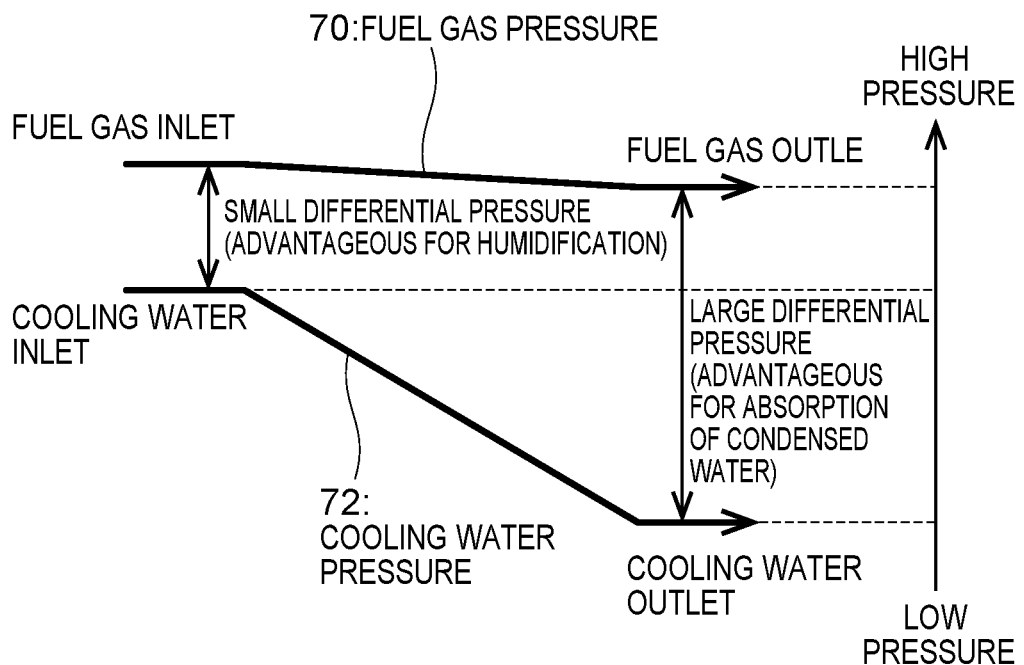
FIG. 9 is a diagram illustrating differential pressures between a fuel gas pressure and a cooling water pressure.

FIG. 9 is a diagram illustrating differential pressures between fuel gases in the fuel-electrode passage 140 and cooling water pressures in a cooling-water passage at positions corresponding to the fuel-electrode passage 140. The vertical axis represents a pressure. A line 70 indicates fuel gas pressures at positions along the fuel-electrode passage 140 from the first inlet 14b to the second outlet 14e of the fuel-electrode passage 140. A line 72 indicates cooling water pressures in the cooling-water passage 160b corresponding to the positions along the fuel-electrode passage 140. That is, the cooling water pressures in the cooling-water passage 160b corresponding to the positions along the fuel-electrode passage 140 are cooling water pressures at positions in the cooling-water passage 160b each of which is located at the shortest distance from a corresponding one of the positions along the fuel-electrode passage 140. More specifically, the line 72 indicates the cooling water pressures in the cooling-water passage 160b at positions vertically below or above the respective positions.

As illustrated in FIG. 9, a differential pressure between the fuel gas pressure and the cooling water pressure can be made larger from the upstream side to the downstream side in the fuel-electrode passage 140. Therefore, a differential pressure between the fuel gas pressure at the first inlet 14b in the fuel-electrode passage 140 and the cooling water pressure in the cooling-water passage 160b at a position vertically below or above the first inlet 14b becomes smaller than a differential pressure between the fuel gas pressure at the second outlet 14e in the fuel-electrode passage 140 and the cooling water pressure in the cooling-water passage 160b at a position vertically below or above the second outlet 14e. In a case where the cooling-water passage 160b is not present at the position directly below or above, the differential water is obtained by using the cooling water pressure in the cooling-water passage 160b near that position.

As described above, each of the first porous separator 14 and the second porous separator 16 is formed by a conductive porous plate having micropores. Therefore, as the differential pressure between the fuel gas pressure and the cooling water pressure becomes smaller, the moisture infiltrating the second porous separator 16 and the moisture infiltrating the first porous separator 14 through the electrolyte membrane 12 are increased. Accordingly, the fuel gas can be humidified more easily at the first inlet 14b in the fuel-electrode passage 140 than at the second outlet 14e. Therefore, it is possible to suppress drying of the electrolyte membrane 12 and temperature increase in the electrolyte membrane 12.

Meanwhile, as described above, as the differential pressure between the fuel gas pressure and the cooling water pressure becomes larger, condensed water retained in the fuel-electrode passage 140 can be absorbed more easily. Therefore, the condensed water generated in the fuel-electrode passage 140 can be absorbed more easily at the second outlet 14e than at the first inlet 14b. That is, since the differential pressure becomes larger toward the downstream side in the fuel-electrode passage 140, carbon corrosion and deterioration of characteristics caused by a puddle in the fuel-electrode passage 140 can be more suppressed toward the downstream side. As described above, by making the differential pressure between the fuel gas pressure and the cooling water pressure larger from the upstream side to the downstream side in the fuel-electrode passage 140, an effect that humidification of the fuel gas more progresses at the first inlet 14b and absorption of the condensed water more progresses at the second outlet 14e is obtained. Accordingly, the effect that humidification of the fuel gas more progresses at the first inlet 14b and absorption of the condensed water more progresses at the second outlet 14e is obtained.

Figure 10:
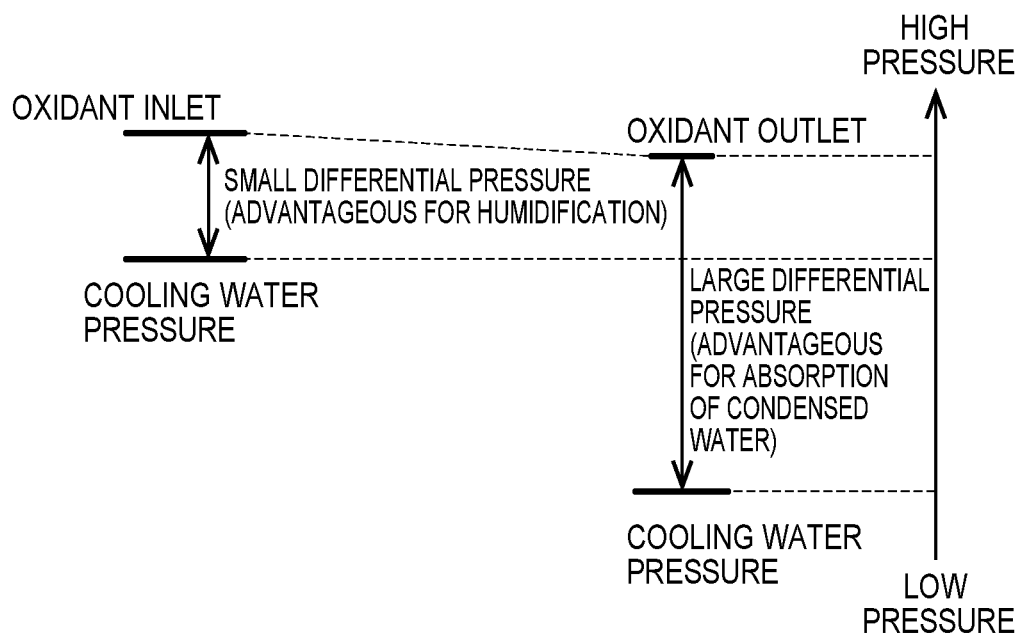
FIG. 10 is a schematic diagram illustrating a differential pressure between an oxidant gas pressure and a cooling water pressure.

FIG. 10 is a schematic diagram illustrating a differential pressure between an oxidant gas at the first inlet 16c in the oxidant-electrode passage 160a and a cooling water pressure and a differential pressure between the oxidant gas at the second outlet 16f and the cooling water pressure. The vertical axis represents a pressure. The first inlet 16c is arranged on the upstream side of the second outlet 16f in the cooling-water passage 160b. Accordingly, a differential pressure between an oxidant gas pressure at the first inlet 16c and a cooling water pressure in the cooling-water passage 160b at a position vertically below the first inlet 16c becomes smaller than a differential pressure between the oxidant gas pressure at the second outlet 16f and the cooling water pressure in the cooling-water passage 160b at a position vertically below the second outlet 16f.

Since the first porous separator 14 is formed by a conductive porous plate having micropores as described above, the moisture infiltrating the first porous separator 14 is increased as the differential pressure between the oxidant gas pressure and the cooling water pressure becomes smaller. Accordingly, the oxidant gas can be humidified more easily at the first inlet 16c in the oxidant-electrode passage 160 than at the second outlet 16f. Therefore, it is possible to suppress drying of the electrolyte membrane 12 and temperature increase in the electrolyte membrane 12.

On the other hand, condensed water retained in the oxidant-electrode passage 160 can be absorbed more easily as the differential pressure between the oxidant gas pressure and the cooling water pressure becomes larger. Therefore, the condensed water retained in the oxidant-electrode passage 160 can be absorbed more easily at the second outlet 16f than at the first inlet 16c. Accordingly, deterioration of characteristics caused by a puddle in the oxidant-electrode passage 160 can be suppressed. As described above, by making the differential pressure between the oxidant gas pressure at the first inlet 16c and the cooling water pressure smaller than the differential pressure between the oxidant gas pressure at the second outlet 16f and the cooling water pressure, an effect that humidification of the oxidant gas more progresses at the first inlet 16c and absorption of the condensed water more progresses at the second outlet 16f is obtained.

Comparative Example

Figure 11:
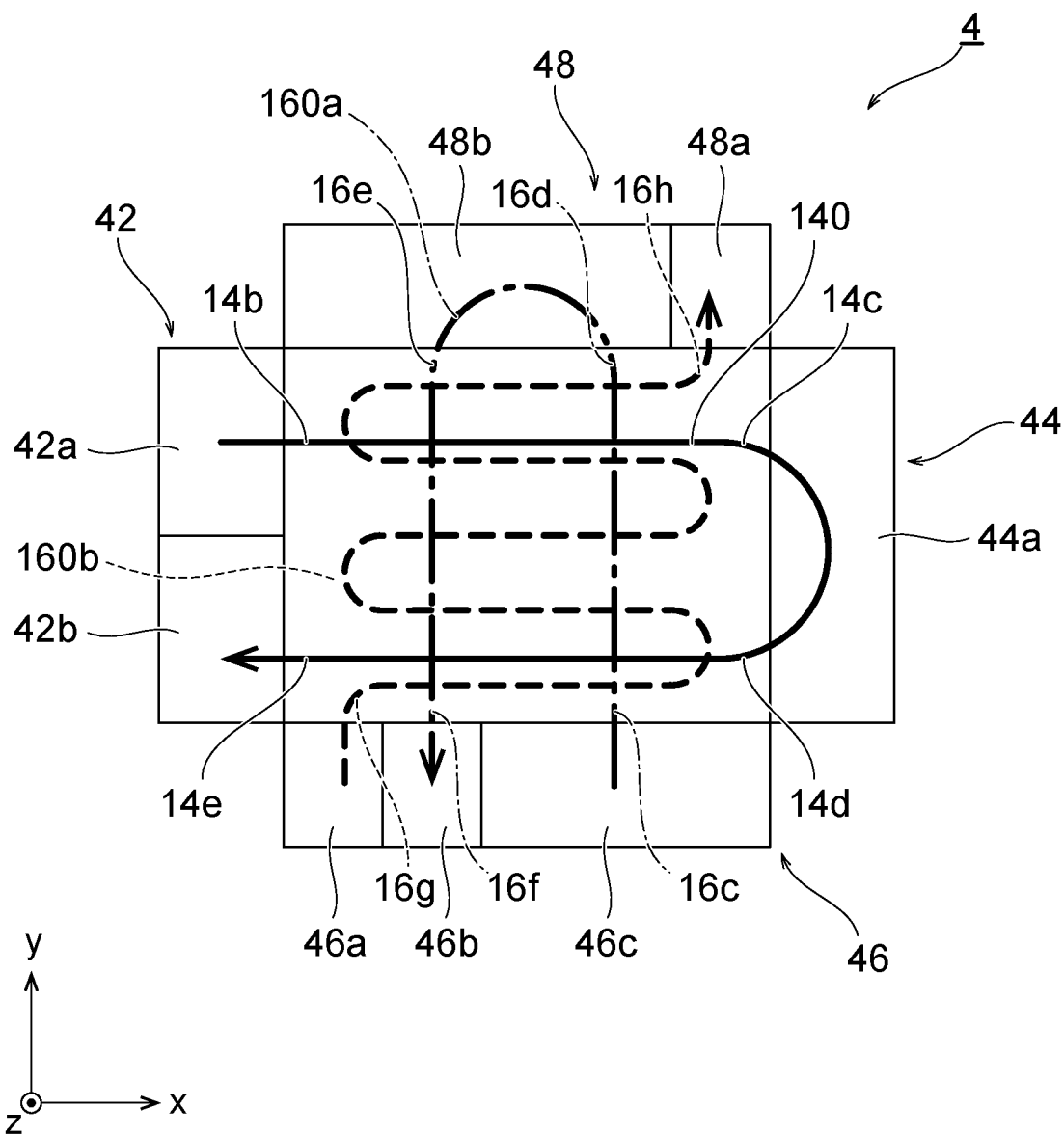
FIG. 11 is a schematic diagram of a conventional fuel cell stack illustrating a state where a manifold is attached to a side surface thereof.

FIG. 11 is a schematic diagram of a conventional fuel cell stack illustrating a state where a manifold is attached to a side surface along the stacking direction of fuel-cell cells of the fuel-cell cell stack 1. As illustrated in FIG. 11, in a conventional fuel cell stack 4, positions of the first inlet 14b and the second outlet 14e of the fuel-electrode passage 140 are opposite to those in the fuel cell stack 1 according to the present embodiment. Further, positions of the first inlet 16c and the second outlet 16f of the oxidant-electrode passage 160a in the conventional fuel cell stack 4 are opposite to those in the fuel cell stack 1 according to the present embodiment.

Figure 12:
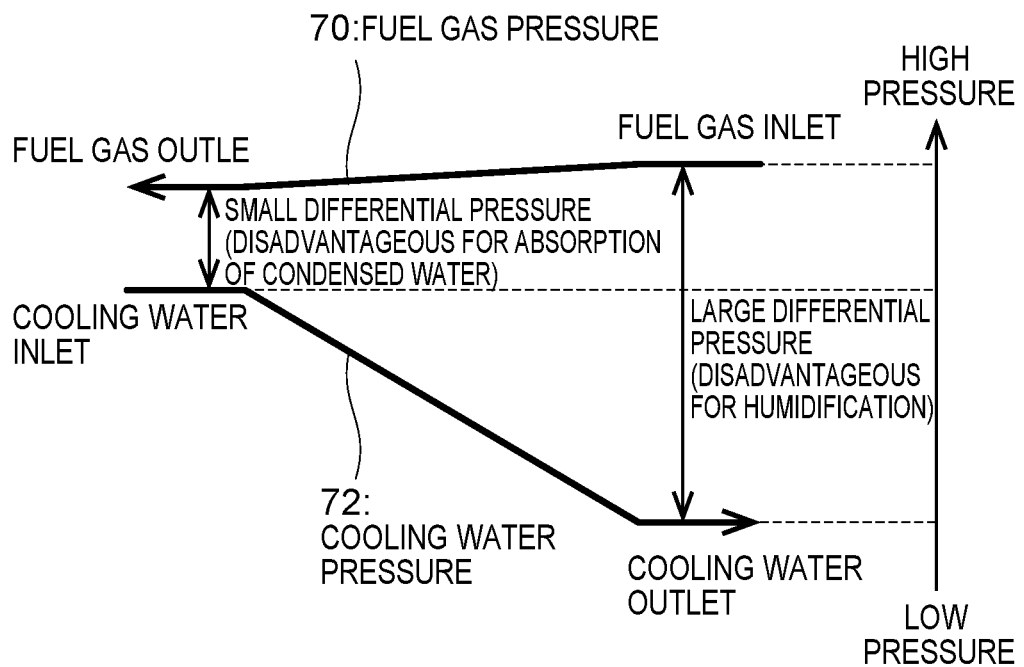
FIG. 12 is a diagram illustrating differential pressures between a fuel gas pressure and a cooling water pressure in a conventional fuel cell stack.

FIG. 12 is a diagram illustrating differential pressures between fuel gas pressures in the fuel-electrode passage 140 and cooling water pressures in a cooling-water passage at positions corresponding to the fuel-electrode passage 140 in a conventional fuel cell stack. The vertical axis represents a pressure. A line 74 indicates fuel gas pressures at positions along the fuel-electrode passage 140 from the first inlet 14b to the second outlet 14e of the fuel-electrode passage 140. The line 72 indicates cooling water pressures in the cooling-water passage 160b at positions vertically below the positions along the fuel-electrode passage 140.

In the conventional fuel cell stack 4, the positions of the first inlet 14d and the second outlet 14e of the fuel-electrode passage 140 are opposite to those in the fuel cell stack 1 according to the present embodiment. Therefore, a differential pressure between the fuel gas pressure at the first inlet 14b and the cooling water pressure in the cooling-water passage 160b at a position vertically below or above the first inlet 14b becomes larger than a differential pressure between the fuel gas pressure at the second outlet 14e in the fuel-electrode passage 140 and the cooling water pressure in the cooling-water passage 160b at a position vertically below or above the second outlet 14e. Accordingly, drying at the first inlet 14b progresses more than at the second outlet 14e. Further, absorption of condensed water at the second outlet 14e is suppressed more than at the first inlet 14b.

Similarly, positions of the first inlet 16c and the second outlet 16f of the oxidant-electrode passage 160a in the conventional fuel cell stack 4 are opposite to those in the fuel cell stack 1 according to the present embodiment. Therefore, a differential pressure between an oxidant gas pressure at the first inlet 16c and the cooling water pressure in the cooling-water passage 160b at a position vertically below the first inlet 16c becomes larger than a differential pressure between the oxidant gas pressure at the second outlet 16f and the cooling water pressure in the cooling-water passage 160b at a position vertically below the second outlet 16f. Accordingly, drying at the first inlet 16c progresses more than at the second outlet 16f. Further, absorption of the condensed water at the second outlet 16f is suppressed more than at the first inlet 16c. Accordingly, the effect obtained in the conventional fuel cell stack 4 is opposite to the effect obtained in the fuel cell stack 1 according to the present application.

As described above, according to the present embodiment, a differential pressure between a fuel gas pressure at the first inlet 14b in the fuel-electrode passage 140 and a cooling water pressure in the cooling-water passage 160b corresponding to the first inlet 14b is made smaller than a differential pressure between the fuel gas pressure at the second outlet 14e in the fuel-electrode passage 140 and the cooling water pressure in the cooling-water passage 160b corresponding to the second outlet 14e. This configuration provides an effect that humidification of the fuel gas progresses more at the first inlet 14b and absorption of the condensed water progresses more at the second outlet 14e. Since the fuel gas can be more humidified at the first inlet 14b as described above, deterioration of the electrolyte membrane 12 due to drying is suppressed. Further, since the differential pressure becomes larger toward the second outlet 14e, retention of the condensed water can be suppressed more.

Furthermore, the first fuel gas passage connecting the first inlet 14b and the first outlet 14c to each other is arranged vertically above or below an upstream region in the cooling-water passage 160b, and the second fuel gas passage connecting the second inlet 14d and the second outlet 14e to each other is arranged vertically above or below a downstream region in the cooling-water passage 160b. Therefore, the differential pressure between the fuel gas pressure and the cooling water pressure can be made larger from the upstream side to the downstream side in the fuel-electrode passage 140, thereby providing an effect that humidification of the fuel gas progresses more at the first inlet 14b and absorption of the condensed water progresses more at the second outlet 14e.

First Modification of First Embodiment

The fuel cell stack 1 according to a first modification of the first embodiment is different from the fuel cell stack 1 according to the first embodiment in that the oxidant-electrode passage 160a is formed in the first porous separator 14 and the fuel-electrode passage 140 is formed in the first porous separator 16. The following descriptions are provided to explain the differences from the fuel cell stack 1 according to the first embodiment.

The electrolyte membrane 12 (FIG. 2) is different from that in the first embodiment in that an oxidant electrode is formed on a vertically upper main surface and a fuel electrode is formed on the other main surface.

Figure 13:
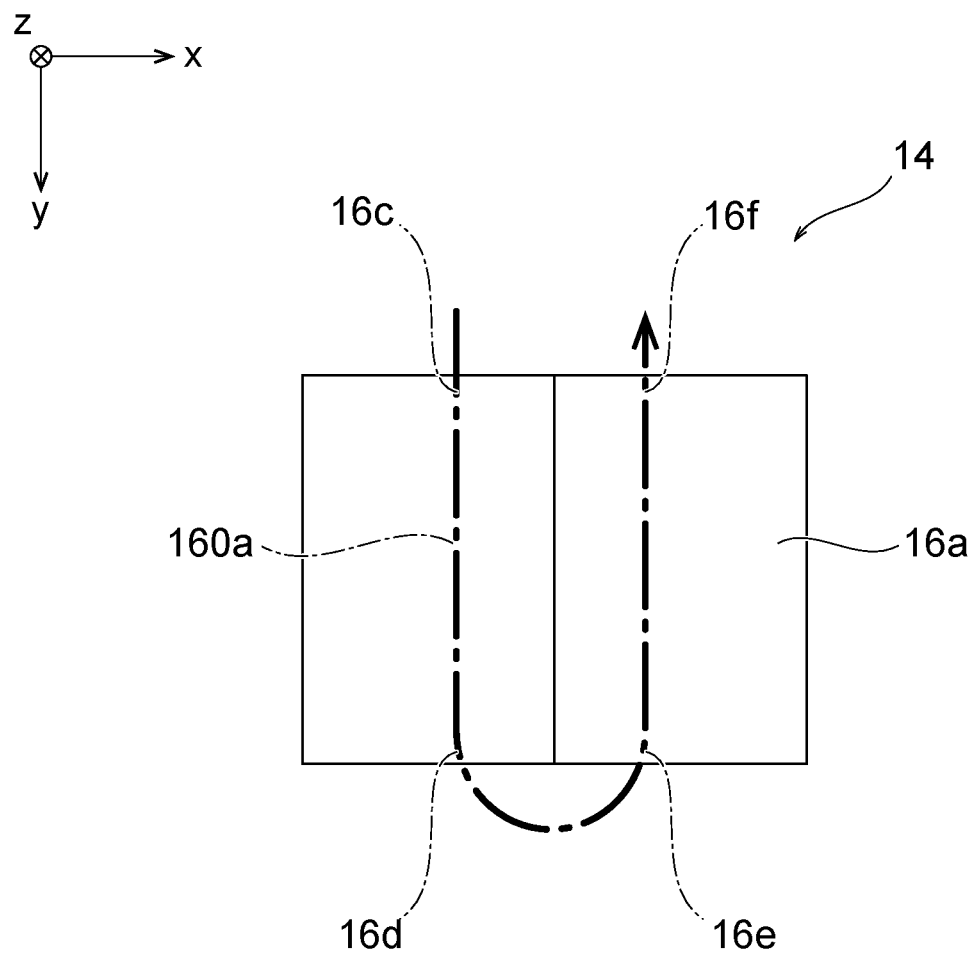
FIG. 13 is a schematic diagram illustrating a shape of a main surface on a side close to an oxidant electrode of a first electrolyte membrane.

FIG. 13 is a schematic diagram illustrating a shape of a main surface of the first porous separator 14 on a side close to an oxidant electrode of the electrolyte membrane 12. The oxidant-electrode passage 160a along the oxidant electrode is formed on the main surface 16a on the side close to the oxidant electrode of the electrolyte membrane 12.

Figure 14:
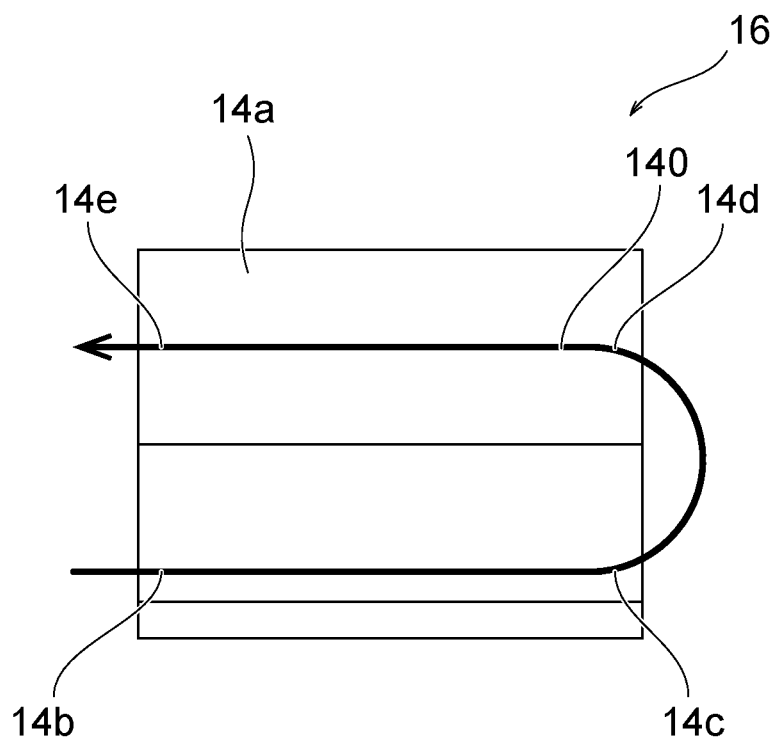
FIG. 14 is a schematic diagram illustrating a shape of a main surface of the second porous separator on a side close to a fuel electrode.
Figure 14:
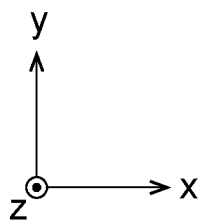

FIG. 14 is a diagram illustrating a shape of the main surface 14a of the second porous separator 16. As illustrated in FIG. 14, the fuel-electrode passage 140 along a fuel electrode is formed in the main surface 14a on a side close to a fuel electrode of the electrolyte membrane 12. Also in a case where the oxidant-electrode passage 160a is formed in the first porous separator 14 and the fuel-electrode passage 140 is formed in the second porous separator 16 as described above, an arrangement equivalent to that in FIG. 8 can be obtained as viewed from vertically above. The first porous separator 14 and the second porous separator 16 according to the present embodiment respectively correspond to a fuel-electrode porous passage plate and a fuel-electrode porous passage plate.

As described above, according to the first modification, the first fuel gas passage connecting the first inlet 14b and the first outlet 14c to each other is arranged vertically above or below an upstream region in the cooling-water passage 160b, and the second fuel gas passage connecting the second inlet 14d and the second outlet 14e to each other is arranged vertically above or below a downstream region in the cooling-water passage 160b. Therefore, a differential pressure between a fuel gas pressure and a cooling water pressure can be made larger from the upstream side to the downstream side in the fuel-electrode passage 140, thereby providing an effect that humidification of a fuel gas progresses more at the first inlet 14b and absorption of condensed water progresses more at the second outlet 14e.

Second Modification of First Embodiment

The fuel cell stack 1 according to a second modification of the first embodiment is different from the fuel cell stack 1 according to the first embodiment in that the direction of a fuel gas flowing in the fuel-electrode passage 140 is reversed, the direction of an oxidant electrode gas flowing in the oxidant-electrode passage 160a is reversed, and the direction of cooling water flowing in the cooling-water passage 160b is reversed. The following descriptions are provided to explain the differences from the fuel cell stack 1 according to the first embodiment.

Figure 15:
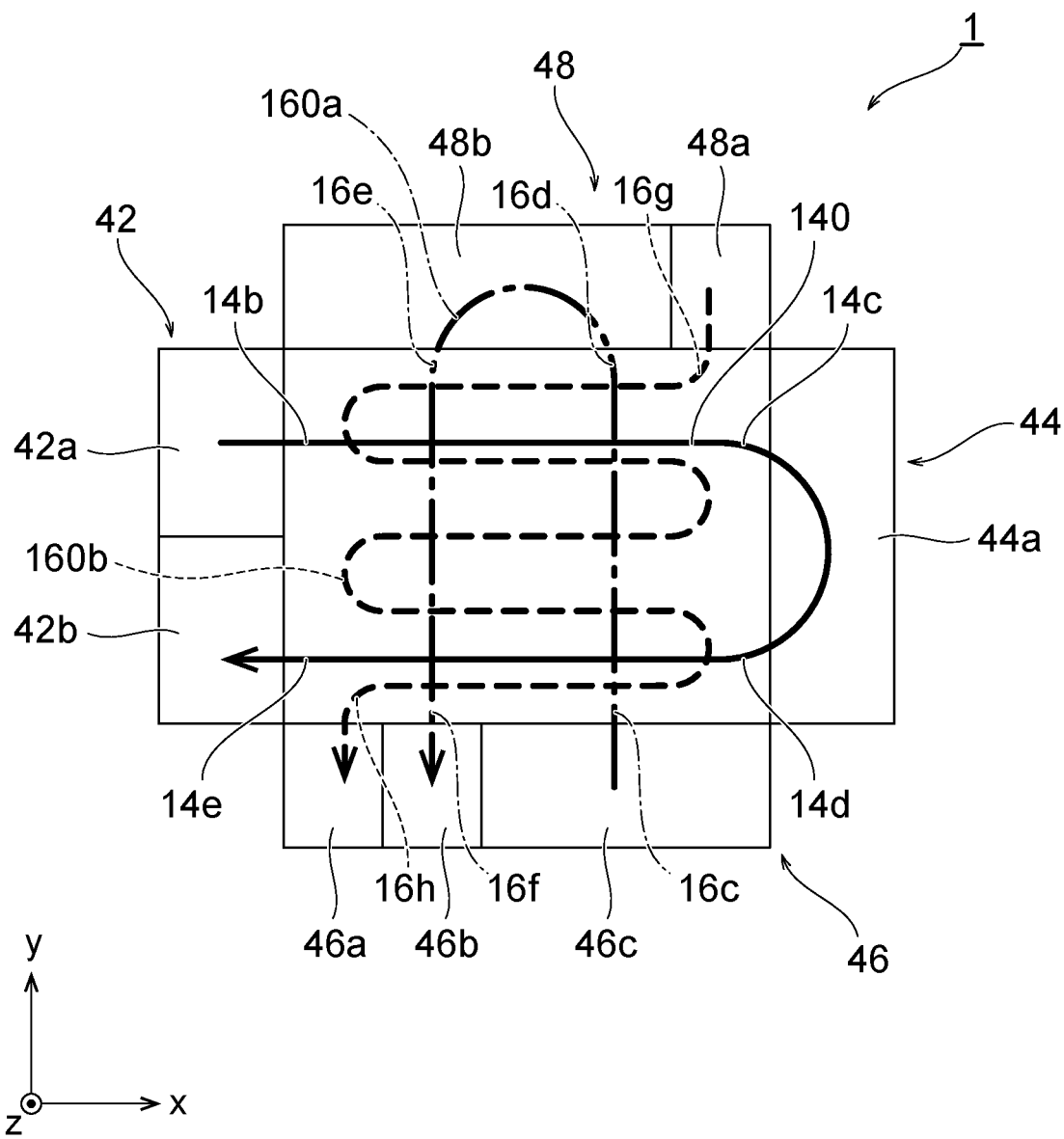
FIG. 15 is a diagram illustrating a state where a manifold is attached to a side surface along a stacking direction of fuel-cell cells according to a modification.

FIG. 15 is a diagram illustrating a state where a manifold is attached to a side surface along a stacking direction of fuel-cell cells of the fuel-cell cell stack 1 according to the second modification. As illustrated in FIG. 15, an operation is performed in which, with respect to the fuel-cell cell stack 1 according to the first embodiment, the direction of a fuel gas flowing in the fuel-electrode passage 140 is reversed, the direction of an oxidant gas flowing in the oxidant-electrode passage 160a is reversed, and the direction of cooling water flowing in the cooling-water passage 160b is reversed.

As described above, according to the present modification, an operation method for the fuel-cell cell stack 1 is changed in such a manner that, with respect to the fuel-cell cell stack 1 according to the first embodiment, the direction of a fuel gas flowing in the fuel-electrode passage 140 is reversed, the direction of an oxidant gas flowing in the oxidant-electrode passage 160a is reversed, and the direction of cooling water flowing in the cooling-water passage 160b is reversed. Also in this operation method, it is possible to make a differential pressure between a fuel gas pressure at the first inlet 14b in the fuel-electrode passage 140 and a cooling water pressure in the cooling-water passage 160b corresponding to the first inlet 14b smaller than a differential pressure between the fuel gas pressure at the second outlet 14e in the fuel-electrode passage 140 and the cooling water pressure in the cooling-water passage 160b corresponding to the second outlet 14e. This configuration provides an effect that humidification of the fuel gas progresses more at the first inlet 14b and absorption of condensed water progresses more at the second outlet 14e. Since the fuel gas can be humidified at the first inlet 14b as described above, deterioration of the electrolyte membrane 12 due to drying is suppressed. Further, since the differential pressure becomes larger toward the second outlet 14e, retention of the condensed water can be suppressed.

Further, by changing an operation method of the fuel-cell cell stack 1, it is possible to arrange the first fuel gas passage connecting the first inlet 14b and the first outlet 14c to each other vertically above an upstream region in the cooling-water passage 160b and arrange the second fuel gas passage connecting the second inlet 14d and the second outlet 14e to each other vertically above a downstream region in the cooling-water passage 160b. Therefore, it is possible to make the differential pressure between the fuel gas pressure and the cooling water pressure from the upstream side to the downstream side in the fuel-electrode passage 140, providing an effect that humidification of the fuel gas progresses more at the first inlet 14b and absorption of the condensed water progresses more at the second outlet 14e.

While certain embodiments of the present invention have been described, these embodiments have been presented by way of example only, and are not intended to limit the scope of the invention. The novel embodiments described herein may be embodied in a variety of other forms, and various omissions, substitutions, and changes may be made without departing from the spirit of the invention. These embodiments and modifications thereof would fall within the scope and spirit of the invention, and would fall within the invention described in the accompanying claims and their equivalents.

The invention claimed is:

1. A fuel cell stack comprising a cell stack having a plurality of unit cells stacked therein, each of the unit cells including an electrolyte membrane having one main surface in which a fuel electrode is arranged and the other main surface that is opposite to the one main surface and in which an oxidant electrode is arranged, a conductive fuel-electrode porous passage plate having hydrophilic micropores in which a fuel-electrode passage is formed in a main surface on a side close to the fuel electrode of the electrolyte membrane, and a conductive oxidant-electrode porous passage plate having hydrophilic micropores in which an oxidant-electrode passage is formed in a main surface on a side close to the oxidant electrode of the electrolyte membrane, each of the unit cells having a cooling-water passage for cooling the cell stack formed in a main surface of the fuel-electrode porous passage plate opposite to the main surface in which the fuel-electrode passage is arranged or in a main surface of the fuel-electrode porous passage plate opposite to the main surface in which the oxidant-electrode passage is arranged, wherein
in the cell stack, at least a part of one main surface of the conductive fuel-electrode porous passage plate is in contact with one main surface of the conductive oxidant-electrode porous passage plate, and a capillary force of water contained in the hydrophilic micropores of the conductive fuel-electrode porous passage plate and the conductive oxidant-electrode porous passage plate prevents an oxidant gas in the oxidant-electrode passage and a fuel gas in the fuel-electrode passage from directly mixing together and a cooling water in the cooling-water passage communicates with the water contained in the hydrophilic micropores.

2. The fuel cell stack of claim 1, wherein a maximum value of a differential pressure between a cooling water pressure of the cooling water in the cooling-water passage and an oxidant gas pressure of the oxidant gas is smaller than a capillary force of the hydrophilic micropores of the conductive oxidant-electrode porous passage plate, and a maximum value of the differential pressure between the cooling water pressure and a fuel gas pressure of the fuel gas is smaller than a capillary force of the conductive fuel-electrode porous passage plate, and a maximum value of a differential pressure between the oxidant gas pressure and the fuel gas pressure is smaller than the capillary force of the conductive oxidant-electrode porous passage plate and the conductive fuel-electrode porous passage plate combined.

3. The fuel cell stack of claim 2, wherein the cooling water pressure is lower than the fuel gas pressure, a differential pressure between a fuel gas pressure at an inlet in the fuel-electrode passage and a cooling water pressure in the cooling-water passage corresponding to the inlet is smaller than a differential pressure between a fuel gas pressure at an outlet in the fuel-electrode passage and a cooling water pressure in the cooling-water passage corresponding to the outlet, and a large one of a maximum value of a differential pressure between the cooling water pressure and an oxidant pressure and a maximum value of a differential pressure between the cooling water pressure and a fuel electrode pressure is smaller than a capillary force in a passage plate.

4. The fuel cell stack of claim 3, wherein in the cell stack, a cooling inlet portion of the cooling water, a cooling outlet portion of the cooling water, an oxidant gas inlet portion of the oxidant gas, an oxidant gas outlet portion of the oxidant gas, a fuel gas inlet portion of the fuel gas, and a fuel gas outlet portion of the fuel gas are provided at non-overlapping positions on each of the main projection planes.

5. The fuel cell stack of claim 1, wherein the fuel-electrode passage includes a first passage configured to introduce the fuel gas from a first side surface along a stacking direction of the cell stack to a third side surface opposed to the first side surface and a second passage configured to introduce the fuel gas from the third side surface to the first side surface, the first passage of the fuel-electrode passage being adjacent to the first side surface and the third side surface and arranged on a side close to a second side surface of the cell stack along the stacking direction, and in the cooling-water passage, a region close to the second side surface is an upstream region, and a region close to a fourth side surface opposed to the second side surface is a downstream region.

6. The fuel cell stack of claim 5, wherein the inlet in the fuel-electrode passage is arranged on a side of the first side surface close to the second side surface, and the outlet in the fuel-electrode passage is arranged on a side of the first side surface close to the fourth side surface, and
the inlet in the cooling-water passage is arranged in the second side surface, and the outlet in the cooling-water passage is arranged on a side close to the fourth side surface.

7. The fuel cell stack of claim 6, wherein the cooling water pressure in the cooling-water passage is lower than an oxidant gas in the oxidant-electrode passage, and a differential pressure between an oxidant pressure at an inlet in the oxidant-electrode passage and a cooling water pressure in the cooling-water passage corresponding to the inlet is smaller than a differential pressure between an oxidant pressure at an outlet in the oxidant-electrode passage and a cooling water pressure in the cooling-water passage corresponding to the outlet.

8. The fuel cell stack of claim 7, further comprising:
a fuel-electrode manifold that is arranged on the first side surface and in which a supply space supplying the fuel gas and a discharge space discharging the fuel gas are divided by a divider; and
a cooling-water manifold arranged on the second side surface and configured to supply the cooling water to the cooling-water passage, wherein the supply space is arranged on a side close to the cooling-water manifold.

9. The fuel cell stack of claim 8, further comprising an oxidant-electrode manifold that is arranged on the second side surface and in which a supply space supplying the oxidant gas and a discharge space discharging the oxidant gas are divided by a divider, wherein
the supply space is arranged on a side close to the cooling-water manifold.

10. The fuel cell stack of claim 8, wherein the cooling water pressure in the cooling-water passage corresponding to the inlet in the fuel-electrode passage is a cooling water pressure in the cooling-water passage at a shortest distance from the inlet, the cooling water pressure in the cooling-water passage corresponding to the outlet in the fuel-electrode passage is a cooling water pressure in the cooling-water passage at a shortest distance from the outlet, the cooling water pressure in the cooling-water passage corresponding to the inlet in the oxidant-electrode passage is a cooling water pressure in the cooling-water passage at a shortest distance from the inlet, and the cooling water pressure in the cooling-water passage corresponding to the outlet in the oxidant-electrode passage is a cooling water pressure in the cooling-water passage at a shortest distance from the outlet.

11. An operation method for a cell stack having a plurality of unit cells stacked therein, each of the unit cells including an electrolyte membrane having one main surface in which a fuel electrode is arranged and the other main surface that is opposite to the one main surface and in which an oxidant electrode is arranged, a conductive fuel-electrode porous passage plate having hydrophilic micropores in which a fuel-electrode passage is formed in a main surface on a side close to the fuel electrode of the electrolyte membrane, and a conductive oxidant-electrode porous passage plate having hydrophilic micropores in which an oxidant-electrode passage is formed in a main surface on a side close to the oxidant electrode of the electrolyte membrane, each of the unit cells having a cooling-water passage for cooling the cell stack formed in a main surface of the fuel-electrode porous passage plate opposite to the main surface in which the fuel-electrode passage is arranged or in a main surface of the fuel-electrode porous passage plate opposite to the main surface in which the oxidant-electrode passage is arranged, wherein in the cell stack, at least a part of one main surface of the conductive fuel-electrode porous passage plate is in contact with one main surface of the conductive oxidant-electrode porous passage plate, and the cell stack is operated so that a capillary force of water contained in the hydrophilic micropores of the conductive fuel-electrode porous passage plate and the conductive oxidant-electrode porous passage plate prevents an oxidant gas in the oxidant-electrode passage and a fuel gas in the fuel-electrode passage from directly mixing together and a cooling water in the cooling-water passage communicates with the water contained in the hydrophilic micropores.

12. The operation method of claim 11, wherein the cell stack is operated so that a maximum value of a differential pressure between a cooling water pressure of the cooling water in the cooling-water passage and an oxidant gas pressure of the oxidant gas is smaller than a capillary force of the hydrophilic micropores of the conductive oxidant-electrode porous passage plate, and a maximum value of the differential pressure between the cooling water pressure and a fuel gas pressure of the fuel gas is smaller than a capillary force of the conductive fuel-electrode porous passage plate, and a maximum value of a differential pressure between the oxidant gas pressure and the fuel gas pressure is smaller than the capillary force of the conductive oxidant-electrode porous passage plate and the conductive fuel-electrode porous passage plate combined.

13. The operation method of claim 12, wherein the cell stack is operated so that the cooling water pressure is lower than the fuel gas pressure, a differential pressure between a fuel gas pressure at an inlet in the fuel-electrode passage and a cooling water pressure in the cooling-water passage corresponding to the inlet is smaller than a differential pressure between a fuel gas pressure at an outlet in the fuel-electrode passage and a cooling water pressure in the cooling-water passage corresponding to the outlet, and a large one of a maximum value of a differential pressure between the cooling water pressure and an oxidant pressure and a maximum value of a differential pressure between the cooling water pressure and a fuel electrode pressure is smaller than a capillary force in a passage plate.

* * * * *